United States Patent [19]
Rudd

[11] 3,780,262
[45] Dec. 18, 1973

[54] THERMAL BANK

[76] Inventor: Robert L. Rudd, 1915 Prior Ave. N., St. Paul, Minn. 55113

[22] Filed: July 28, 1972

[21] Appl. No.: 276,141

[52] U.S. Cl.............. 219/341, 126/270, 126/400, 165/18, 219/325, 219/378, 219/528, 219/530
[51] Int. Cl........................... H05b 1/00, F24h 7/00
[58] Field of Search.................... 219/302, 325, 326, 219/341, 365, 378, 530, 540, 528, 529, 544, 345, 213, 462; 165/18, 104; 126/400, 270, 271; 62/137, 139; 128/399

[56] References Cited
UNITED STATES PATENTS

| | | | |
|---|---|---|---|
| 1,025,144 | 5/1912 | Kuhn | 219/530 |
| 1,439,094 | 12/1922 | Gingras | 219/530 X |
| 2,114,396 | 4/1938 | McFarlan et al. | 219/540 X |
| 2,479,268 | 8/1949 | Sarria | 219/378 UX |
| 2,873,352 | 2/1959 | Franco | 219/528 |
| 3,202,801 | 8/1965 | Saluri | 219/530 X |
| 3,720,198 | 3/1973 | Laing et al. | 219/378 UX |

Primary Examiner—Anthony Bartis
Attorney—George F. Williamson et al.

[57] ABSTRACT

A thermal bank is comprised of a granular mass of polyvinyl chloride which surrounds a heating mechanism such as an electrical resistance heater or a conduit containing heated fluid. The granular polyvinyl chloride mass is formed by treating commercial dry flaked polyvinyl chloride with a small amount of stabilizer which causes the powder to form granules having interstices therebetween. The granular polyvinyl chloride mass not only serves as a high temperature insulator but also serves as an excellent heat storage system. A metallic foil surrounds the polyvinyl chloride mass and serves as a radiation shield, and an air impervious outer cover surrounds the foil and prevents convection losses from the mass. The thermal bank may be constructed as a heating pad provided with a window in the foil and plastic covers to permit controlled dissipation of the heat. The thermal bank may also be constructed as the primary storage center for heating a building structure deriving its heat from solar energy during the day and releasing it gradually during the night.

5 Claims, 4 Drawing Figures

PATENTED DEC 18 1973　　3,780,262

3,780,262

THERMAL BANK

BRIEF SUMMARY OF THE INVENTION

It is a general object of this invention to provide a novel thermal bank, of simple and inexpensive construction, which when heated stores heat energy and permits controlled dissipation of the heat over a substantial period of time. The thermal bank includes a granular mass of polyvinyl chloride which surrounds a heating mechanism which generates heat for the mass. The mass of granular polyvinyl chloride not only functions as a very good heat sink, which permits slow controlled dissipation of heat over a relatively long period of time, but also functions as a high temperature insulator which permits heating of the thermal bank to approximately 300° F.

The thermal bank is provided with a metallic foil cover which prevents radiation heat losses from the mass, and a plastic outer cover which is fluid impervious and which prevents air thermals conduction heat losses from the mass. The thermal bank is not only especially adapted for use as a heating pad or for use as a small heat dispensing appliance but it may also be used as a primary heat dispensing system for a home or the like. These and other objects etc.

DETAILED DESCRIPTION

Figure 1:
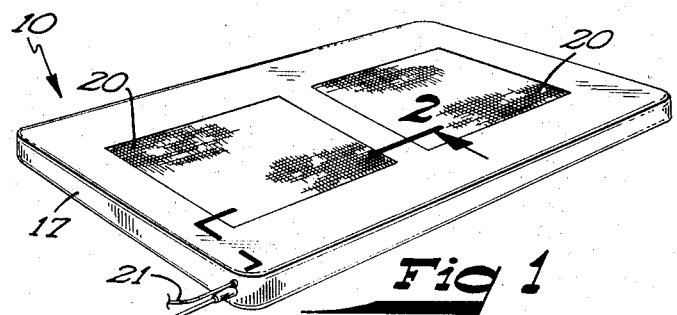
FIG. 1 is a perspective view of the thermal bank constructed as a heating pad.
Figure 2:
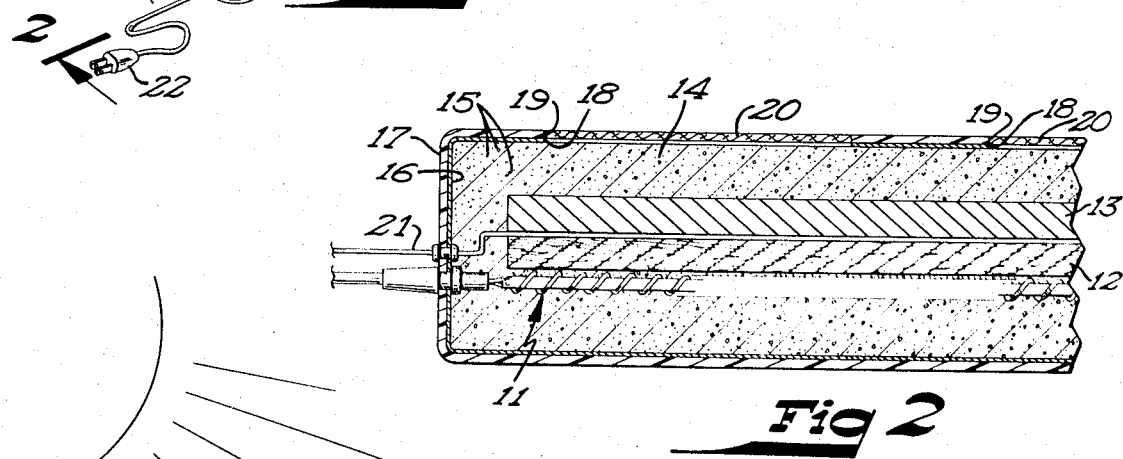
FIG. 2 is a cross sectional view taken approximately along line 2—2 of FIG. 1 and looking in the direction of the arrows.

Referring now to the drawings and more specifically to FIGS. 1 and 2, it will be seen that one embodiment of the novel thermal bank has been constructed as a heating pad which is designated generally by the reference numeral 10. The heating pad 10 includes a heating mechanism which is comprised of an electrical resistance heater 11. The electrical resistance heater 11 is connected by conductors to a suitable source of electrical current and when energized heats to a predetermined temperature. It is pointed out that the heating mechanism 11 may be of flexible construction to permit flexing of the thermal bank when it is in the form of a heating pad. A non-metallic electrical insulator member 12 is positioned adjacent the electrical resistance heater 11 and insulates the resistance heater from a primary heat sink member 13 which is formed of a suitable metallic material such as steel or the like. The insulator member 12 has a high specific heat coefficient and is preferably formed of hard wood so that the insulator not only serves as an electrical insulator which insulates the primary heat sink member from the electrical resistance heater but also functions as a secondary heat sink.

The heating mechanism, insulator and primary heat sink are surrounded by or encased in a mass 14 of granular polyvinyl chloride. Commercial polyvinyl chloride is generally available in a dry, usually flake condition. It is desirable to change the flake condition of polyvinyl chloride into a granular particulate form to increase the interstices or air spaces between individual particles. The heat insulating properties of the polyvinyl chloride resides in its granular condition.

The dry commercial polyvinyl chloride is therefore treated with a suitable commercial stabilizer such as ADBASTAB manufactured by Advanced Chemical Company, or Mark WK-6 or Mark 649-A manufactured by Argus Company. Other commercial stabilizers which are the chemical equivalent of the previously mentioned stabilizers may also be used. Typically, approximately eight quarts of the stabilizer is added to a 55 gallon drum of polyvinyl chloride in a mixer or blender and the polyvinyl chloride is thoroughly mixed. When treated with the stabilizer, the dry flake polyvinyl chloride assumes a granular characteristic similar to sugar.

The mass of granular polyvinyl chloride is encased in an inner foil cover 16 which has a reflective inner surface. An outer fluid impervious cover is also provided and is preferably made of a suitable fluid impervious flexible material such as polyethylene film or the like. The inner foil cover 16 has one or more openings 18 therein which are disposed in registering relation with corresponding openings 19 in the outer cover 17.

A fabric shield 20 formed of a suitable cloth material covers the entire unit. The openings in the cloth is the path or passage through which heat is dissipated when used as a heating pad. A suitable thermocouple 21 is also provided and is preferably adapted to sense the temperature adjacent the primary heat sink member 13. The thermocouple may be connected to a suitable control unit such as a thermostat to control the level of temperature which the heating pad may attain. The electrical resistance heater 11 is provided with a suitable conventional bayonet type electric plug 22 which may be readily insertable into a conventional electric outlet socket.

In use, a user will plug the heating pad into a conventional outlet which energizes the electrical resistance heating mechanism 11. The heating mechanism will heat the insulator member 12 and the primary heat sink 13 while simultaneously heating the mass of polyvinyl chloride. The thermal bank may be heated to a temperature of 300° F. but care should be taken to assure that the temperature does not exceed 300° F., since the polyvinyl chloride will harden into a relatively solid mass at temperatures in excess of 300° F. It will be appreciated that if the polyvinyl chloride hardens into a solid mass, its high temperature heat insulating characteristics will be considerably reduced.

After the thermal bank or heating pad has been heated to a predetermined temperature, the heating mechanism may be disconnected from its source of energy and heat will be dissipated in a controlled manner through the windows in the foil and plastic covers. Operational experience has shown that when the heating pad is heated to a temperature of approximately 300° F., the internal temperature of the device dropped from 300° to approximately 72° F. after approximately 7 hours. It was also found that the external temperature being dissipated from the device dropped from approximately 200° to approximately 100° F. after approximately 2 hours. This high heat retention property of the thermal bank is primarily attributable to the thermal characteristics of the polyvinyl chloride when in a granular condition. Not only does the polyvinyl chloride have the heat resistance characteristics, but the granular polyvinyl chloride also serves as an excellent high temperature insulator permitting reasonable high temperatures to be achieved with primary and secondary heat sinks. In this respect, it should be pointed out that the insulator member 12 is formed of a hard wood and has a relatively high specific heat coefficient quite similar to the specific heat coefficient of the primary metal heat sink.

The inner foil cover 16 has a reflective inner surface and serves as a radiation shield since it prevents a loss of heat radiated from the interstices of the mass of polyvinyl chloride. The fluid impervious outer cover serves as a convection shield since it prevents the circulation of air through the mass of polyvinyl chloride.

Figure 3:
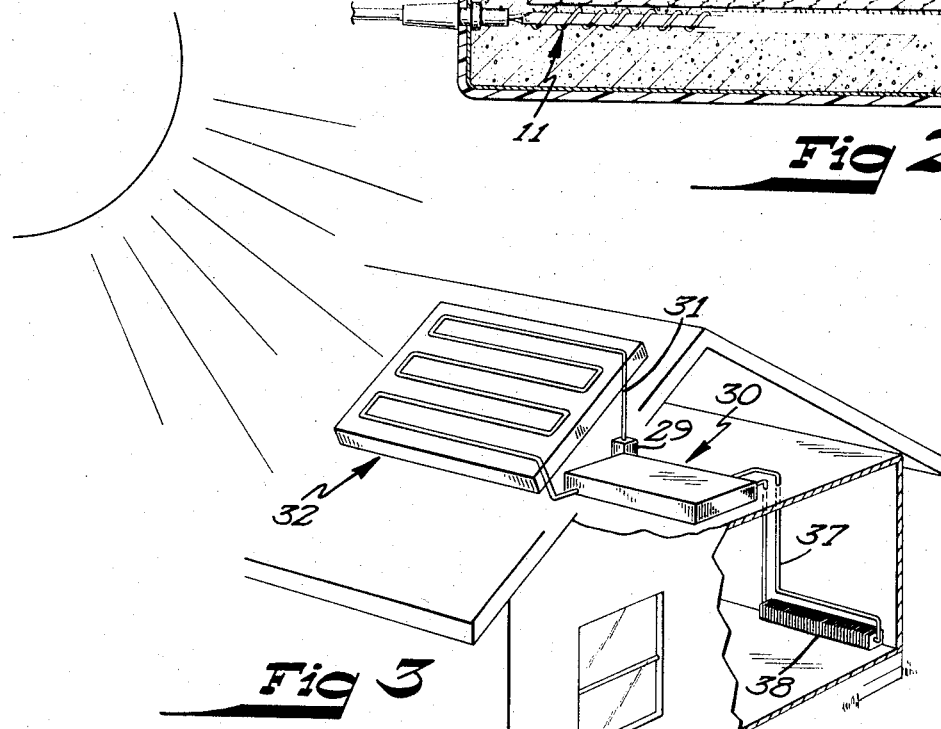
FIG. 3 is a perspective view of the thermal bank used as the primary heat dispensing means for a building such as a house.
Figure 4:
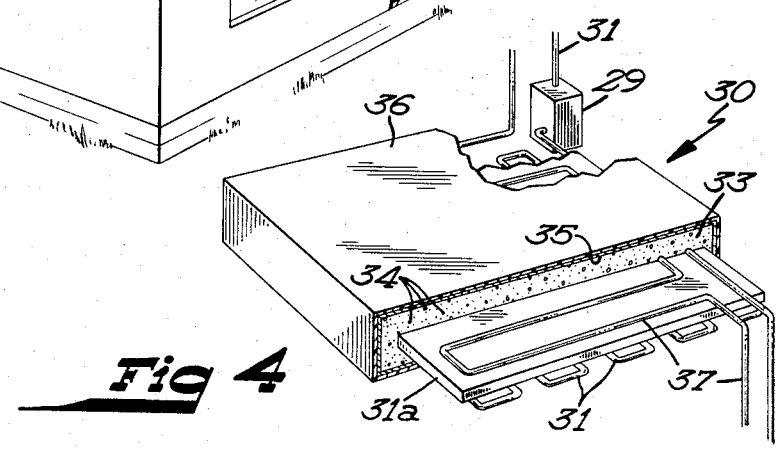
FIG. 4 is a cross sectional view of the thermal bank illustrated in FIG. 3.

Referring now to FIGS. 3 and 4, it will be seen that a entirely different embodiment of the thermal bank, designated generally by the reference numeral 30 is thereshown. The thermal bank also includes a heating mechanism which, as shown, is in the form of a conduit or pipe through which is circulated a heated fluid such as hot water. The hot water may be heated by a solar heating system 32 and the water heated by solar energy is directed to the heat pump 29 which extracts the heat from the water and directs high temperature water into the heating pipe 31. The pipe or conduit 31 may be coiled and disposed in contact with a primary heat sink member 31a formed of a suitable metal. It is also pointed out that the heating conduit or pipe may be shaped into a heat sink member which is provided with a passage through which the heated water flows, the heat sink member having any desirable shape or configuration and being formed of a suitable metallic material.

The heating conduit and primary heat sink member are surrounded by a granular mass 33 of polyvinyl chloride in which the invividual particles of polyvinyl chloride have interstices 34 therebetween. The thermal bank is provided with an inner foil cover 35 which covers the mass of polyvinyl chloride and which serves as a radiation shield. The radiation shield or cover 35 is preferably formed of aluminum having a reflective inner surface and is in turn covered by a fluid impervious outer cover 36 preferably formed of polythylene or the like. The polythylene cover serves as a convection shield in the manner of the previously described embodiment.

A coiled heat transmission conduit 37 is positioned within the mass of polyvinyl chloride and is connected to any heat dispensing means such as radiators 38, so that the water heated by the polyvinyl chloride mass will be circulated between the radiators and the thermal bank.

With this arrangement, the thermal bank is heated by heat from a solar heating system and the heat is very effectively stored for use as desired. It will be appreciated that the quantum of heat will be dependant upon the size of the polyvinyl chloride mass. It will be appreciated while the thermal bank has been illustrated for use as a heating pad and also as use as a heat storage means for heating a building, the thermal bank will obviously have other applications.

From the foregoing description, it will be noted that the heat bank by using only material with relatively high specific heat coefficients, the ability to retain heat in a relatively small volume has been substantially increased. It will further be noted that one of the unique features of the present thermal bank is the dual function of the granular polyvinyl chloride which serves not only as an excellent high temperature heat insulator but also has a extraordinary heat retention characteristics.

Thus it will be seen that I have provided a novel thermal bank, which is not only of simple and inexpensive construction, but one which functions in a more efficient manner than any heretofore known comparable device.

I claim:

1. A thermal bank for controlled dissipation of stored heat energy, comprising
   a heating mechanism,
   a primary heat sink member disposed in close proximal relation with said heating mechanism to receive heat therefrom and to store heat therein,
   a mass of particulate granular polyvinyl chloride surrounding said heating mechanism and said primary heat sink member, the granular mass of polyvinyl chloride material being comprised of granular particles having interstitial spaces therebetween, said polyvinyl chloride mass serving as a high temperature heat insulator insulating the heating mechanism and primary heat sink from the exterior, and also serving as a secondary heat sink for storing and dissipating heat energy,
   an inner cover formed of a metallic foil material having a reflective inner surface covering said polyvinyl chloride mass and restricting radiation heat losses therefrom,
   a flexible plastic gas impervious outer cover covering said foil cover and forming a fluid seal with respect to said polyvinyl chloride mass to prevent convection losses therefrom,
   and means intercommunicating the polyvinyl chloride mass with the exterior of said outer corner for permitting controlled transmission of heat from said polyvinyl chloride mass to the exterior.

2. The thermal bank as defined in claim 1 wherein said heating mechanism comprises an electrical resistance heating mechanism means.

3. The thermal bank as defined in claim 1 wherein said means intercommunicating said polyvinyl chloride mass with the exterior comprises registered openings in said inner and outer covers.

4. The thermal bank as defined in claim 2 and an insulator member interposed between said heating mechanism and said primary heat sink member, said insulator member being formed of a non-metallic material having a high specific heat coefficient and serving as a secondary heat sink.

5. The thermal bank as defined in claim 1 wherein said heating mechanism comprises a conduit connected in communicating relation to a source of heated fluid whereby the heated fluid provides heat for heating the primary heat sink member and the polyvinyl chloride mass, said intercommunicating transmission means comprising a second fluid circulating conduit extending through said inner and outer covers into said polyvinyl chloride mass.

* * * * *

UNITED STATES PATENT OFFICE
CERTIFICATE OF CORRECTION

Patent No. 3,780,262           Dated December 18, 1973

Inventor(s)    Robert L. Rudd

It is certified that error appears in the above-identified patent and that said Letters Patent are hereby corrected as shown below:

Column 4, line 44, the word "mechanism" should be deleted.

Signed and sealed this 23rd day of April 1974.

(SEAL)
Attest:

EDWARD M. FLETCHER, JR.          C. MARSHALL DANN
Attesting Officer                Commissioner of Patents